United States Patent
Brace (10) Patent No.: US 12,544,687 B2
(45) Date of Patent: Feb. 10, 2026

(54) PROCESSES AND APPARATUSES FOR DISTILLATION OF AN ACETIC ACID AND PROPIONIC ACID-CONTAINING STREAM IN AN ACETIC ACID PRODUCTION UNIT

(71) Applicant: Ineos Acetyls UK Limited, Lyndhurst (GB)

(72) Inventor: James William Brace, Camerton (GB)

(73) Assignee: Ineos Acetyls UK Limited, Lyndhurst (GB)

( * ) Notice: Subject to any disclaimer, the term of this patent is extended or adjusted under 35 U.S.C. 154(b) by 441 days.

(21) Appl. No.: 18/030,555

(22) PCT Filed: Sep. 30, 2021

(86) PCT No.: PCT/EP2021/077012
§ 371 (c)(1),
(2) Date: Apr. 6, 2023

(87) PCT Pub. No.: WO2022/073853
PCT Pub. Date: Apr. 14, 2022

(65) Prior Publication Data
US 2023/0415065 A1 Dec. 28, 2023

(30) Foreign Application Priority Data
Oct. 6, 2020 (GB) ...................................... 2015835

(51) Int. Cl.
*B01D 3/32* (2006.01)
*B01D 3/14* (2006.01)
*C07C 51/44* (2006.01)

(52) U.S. Cl.
CPC ................. *B01D 3/32* (2013.01); *B01D 3/14* (2013.01); *C07C 51/44* (2013.01)

(58) Field of Classification Search
CPC ..................................................... C07C 51/44
See application file for complete search history.

(56) References Cited

U.S. PATENT DOCUMENTS

| 4,029,553 A | 6/1977 | Price |
| 5,756,836 A | 5/1998 | Shimizu et al. |

(Continued)

FOREIGN PATENT DOCUMENTS

| CN | 104045548 B | 8/2016 |
| EP | 0161874 A | 11/1985 |

(Continued)

OTHER PUBLICATIONS

Xiaode, Wu, Ed. "Principles of Chemical Engineering, Part 2" Tianjin Science and Technology Press, Tianjin, 1983, p. 25.

(Continued)

*Primary Examiner* — Medhanit W Bahta
(74) *Attorney, Agent, or Firm* — McDonnell Boehnen Hulbert & Berghoff LLP (57) ABSTRACT

The present disclosure relates generally to processes and systems for distillation of acetic acid products. In one aspect, the disclosure provides a process for separating a feed stream comprising acetic acid and propionic acid in a distillation column. The process includes introducing a feed stream into the column through a feed inlet; withdrawing a first product stream comprising acetic acid and propionic acid from a first draw outlet disposed at a level above the level of the feed inlet; and withdrawing a second product stream comprising acetic acid and propionic acid from a second draw outlet disposed at a level between the level of the feed inlet and the level of the first draw outlet. The volume ratio of the first product stream to the second product stream is in the range of 1:9 to 19:1; and the amount of propionic acid present in the second product stream is at least 50 ppmw greater than the amount of propionic acid present in the first product stream.

17 Claims, 1 Drawing Sheet

(56) References Cited

U.S. PATENT DOCUMENTS

| | | |
|---|---|---|
| 6,211,405 B1 | 4/2001 | Cheung et al. |
| 8,969,613 B2 | 3/2015 | Hallinan et al. |
| 9,102,612 B2 | 8/2015 | Hallinan et al. |
| 10,183,905 B2 | 1/2019 | Shimizu et al. |
| 2011/0288333 A1 | 11/2011 | Shaver et al. |
| 2017/0081271 A1 | 3/2017 | Bristow |
| 2017/0190649 A1 | 7/2017 | Hennigan |
| 2018/0201562 A1 | 7/2018 | Shimizu et al. |
| 2018/0201563 A1 | 7/2018 | Shimizu |
| 2018/0201564 A1 | 7/2018 | Shimizu et al. |
| 2020/0140366 A1 | 5/2020 | Shimizu |

FOREIGN PATENT DOCUMENTS

| | | |
|---|---|---|
| EP | 0645362 A | 3/1995 |
| EP | 0728727 A | 8/1996 |
| EP | 0936209 A1 | 8/1999 |
| EP | 3333147 A1 | 6/2018 |
| EP | 3392233 A1 | 10/2018 |
| EP | 3398930 A1 | 11/2018 |
| EP | 3401302 A1 | 11/2018 |
| EP | 3401303 A1 | 11/2018 |
| WO | 2009/042078 A1 | 4/2009 |
| WO | 2015/193182 A1 | 12/2015 |
| WO | 2016123194 A1 | 8/2016 |

OTHER PUBLICATIONS

Haynes, Anthony. "Acetic Acid Synthesis by Catalytic Carbonylation of Methanol", Organomet Chem. 2006, vol. 18, pp. 179-205.

Van Duc Long, Nguyen et al. "Optimal retrofit of a side stream col. to a dividing wall col. for energy efficiency maximization", Chemical Engineering Research and Design. 2013, vol. 91, iss. 12, pp. 2291-2298.

International Search Report and Written Opinion of International Patent Application No. PCT/EP2021/077012 mailed Jan. 14, 2022, 13 pages.

Search Report of UK Patent Application No. GB2015835.8, mailed Mar. 19, 2021, 1 page.

PROCESSES AND APPARATUSES FOR DISTILLATION OF AN ACETIC ACID AND PROPIONIC ACID-CONTAINING STREAM IN AN ACETIC ACID PRODUCTION UNIT

CROSS-REFERENCE TO RELATED APPLICATIONS

This application is a U.S. national phase application of International Patent Application No. PCT/EP2021/077012, filed Sep. 30, 2021, which claims the benefit of UK Provisional Patent Application no. 2015835.8, filed on Oct. 6, 2020, each of which is incorporated by reference in its entirety.

BACKGROUND OF THE DISCLOSURE

1. Field

The present disclosure relates generally to processes and apparatuses for distillation of acetic acid and propionic acid-containing streams useful in the production of acetic acid.

2. Technical Background

Commercially, acetic acid has been manufactured for many years by carbonylating methanol with carbon monoxide in the presence of a Group VIII carbonylation catalyst. Typically, carbon monoxide is contacted with methanol in the presence of a rhodium or an iridium homogeneous or heterogeneous carbonylation catalyst, methyl iodide and water in one or more reaction zones. The effluent of the reaction zone is typically conducted to a flash zone, where a substantial fraction of the volatile components are vaporized away from the Group VIII metal carbonylation catalyst, which can be recycled to the reaction zone. The vaporized fraction is withdrawn from the flash zone to provide a crude product stream that includes not only the desired acetic acid product, but also methyl iodide, methyl acetate, and water. Acetic anhydride is often provided as a co-product. Notably, propionic acid is often a side reaction product, with the amount present dictated primarily by conditions in the reactor zone. While less volatile than acetic acid, propionic acid is sufficiently volatile to be included in the crude product stream.

Distillation is typically used to provide a purified acetic acid stream from the crude product stream. For example, certain conventional processes use a three-column configuration including a light-ends column, a drying column and a heavy-ends column. The light-ends column is used to remove "light" components including water, methyl iodide and methyl acetate overhead, with a "wet" acid stream being withdrawn at the base and conducted to the drying column, where more water is removed overhead to provide a "dry" acid stream at the base. In alternative configurations, the light-ends column is operated to also dry the acid stream by removing substantially more water overhead together with the methyl iodide and methyl acetate; in such configurations, the drying column can be omitted. The heavy-ends column separates the effluent of the base of the drying column (or the light-ends column, if the drying column is omitted) into an acetic acid product stream with a relatively low amount of propionic acid, typically taken from a sidedraw near the top of the heavy-ends column, and a mixed propionic acid/acetic acid stream at the base of the heavy-ends column.

But distillation to provide an acetic acid product stream with a low amount of propionic acid is an energy intensive process. It remains desirable to provide separation methods that improve energy efficiency while still providing acetic acid meeting customers' propionic acid specifications.

SUMMARY

The scope of the present disclosure is not affected to any degree by the statements within the summary.

In one aspect, the disclosure provides a process for separating a feed stream comprising acetic acid and propionic acid in a distillation column, the distillation column comprising
- a bottom section in thermal communication with a heat source;
- a feed inlet positioned at a level above the bottom section;
- a first draw outlet positioned at a level above the feed inlet;
- a second draw outlet positioned at a level between the feed inlet and the first draw outlet;
- a vapour outlet positioned at a level above the first draw outlet; and
- a bottoms outlet positioned at a level within the bottom section;

the process comprising
- providing heat from the heat source at the bottom section of the distillation column;
- introducing the feed stream into the distillation column through the feed inlet;
- withdrawing a first product stream comprising acetic acid and propionic acid from the first draw outlet; and
- withdrawing a second product stream comprising acetic acid and propionic acid from the second draw outlet;

wherein
- a volume ratio of the first product stream to the second product stream is in the range of 1:9 to 19:1; and
- an amount of propionic acid present in the second product stream is at least 50 ppmw greater than the amount of propionic acid present in the first product stream.

Another aspect of the disclosure provides a distillation system for separating a feed stream comprising acetic acid and propionic acid, the distillation system comprising
- a heat source; and
- a distillation column comprising
  - a bottom section in thermal communication with the heat source;
  - a feed inlet positioned at a level above the bottom section, the feed inlet being in fluid communication with a source of the feed stream comprising acetic acid and propionic acid;
  - a first draw outlet positioned at a level above the feed inlet;
  - a second draw outlet positioned at a level between the feed inlet and the first draw outlet;
  - a vapour outlet positioned at a level above the first draw outlet; and
  - a bottoms outlet positioned at a level within the bottom section.

Other aspects of the disclosure will be apparent to those skilled in the art in view of the description that follows.

DETAILED DESCRIPTION

The present inventors note that an operator of a heavy-ends column can attempt to control the amount of propionic acid in the acetic acid product stream by adjusting the operation of the heavy-ends column. By increasing the column reflux ratio, the concentration of propionic acid in the acetic acid product stream can be reduced. However, this will also increase the energy consumption of the column.

The present inventors also note that the requirements of customers with respect to propionic acid content can vary. Some customers require stringently low propionic acid concentrations for their processes. However, others, such as those using acetic acid in processes for making purified terephthalic acid or vinyl acetate monomer, are much less sensitive to the presence of propionic acid.

One simple way to ensure that propionic acid requirements are met for all customers is to operate the heavy-ends column at the most stringent customer propionic acid specification. However, this involves a variable cost penalty in the form of the energy needed to operate the heavy-ends column at the reflux ratio necessary to meet such specification.

It is also possible to provide different acetic acid product streams, having different propionic acid concentrations, to different customers. This can reduce the overall amount of energy needed to operate the process, i.e., due to the reduced energy used in the distillation of a lower-purity product. To achieve this, the plant could be run on a campaign basis, producing acetic acid of different propionic acid specifications at dedicated periods of time. But this requires very careful planning, introduces additional complexity, and requires additional storage to segregate the different purity products.

The present inventors provide herein a process for operating a heavy-ends column so as to simultaneously provide two different acetic acid product streams having different propionic acid concentrations, while operating at a substantial energy savings. One embodiment of such a process is described with respect to FIG. 1. A distillation column 120 is used to separate a feed stream 110 including acetic acid and propionic acid. Distillation column 120 includes a bottom section 122 in thermal communication with a heat source 150, which can be, e.g., a reboiler. Distillation column 120 further includes a feed inlet 132 positioned at a level above the bottom section 122; a first draw outlet 136 (here, in the form of a first sidedraw outlet) positioned at a level above the feed inlet 132; a second draw outlet 134 (here, in the form of a second sidedraw outlet) positioned at a level between the feed inlet 132 and the first draw outlet 136; a vapour outlet 138 positioned at a level above the first draw outlet 136; and a bottoms outlet 140 positioned at a level within the bottom section 122. The process includes providing heat from the heat source 150 at the bottom section 122 of the distillation column 120; and introducing the feed stream 110 into the distillation column 120 through the feed inlet 132. A first product stream 146 comprising acetic acid (e.g., in at least 99% purity) and propionic acid is withdrawn from the first draw outlet 136, and a second product stream 144 comprising acetic acid (e.g., in at least 99% purity) and propionic acid from is withdrawn from the second draw outlet 134. The volume ratio of the first product stream to the second product stream is in the range of 1:9 to 19:1. Notably, an amount of propionic acid present in the second product stream is at least 50 ppm by weight (ppmw) greater than the amount of propionic acid present in the first product stream. In this manner, the process provides two different product streams having different propionic acid concentrations. Based on the disclosure herein, the person of ordinary skill in the art can adjust process conditions, such as reflux ratio, relative positioning of the draw outlets, and ratio of product streams to provide product streams of desired propionic acid concentrations.

Based on the disclosure herein, the person of ordinary skill in the art can provide the first product stream and the second product stream in a variety of volume ratios. For example, in certain embodiments as otherwise described herein, the volume ratio of the first product stream to the second product stream is in the range of 1:2 to 5:1. In certain such embodiments, the volume ratio of the first product stream of the second product stream is in the range of 1.5:1 to 4:1, or in the range of 1:1 to 3:1. In such embodiments, relatively more of the higher-purity first product stream is withdrawn. In other embodiments as otherwise described herein, the volume ratio of the first product stream to the second product stream is in the range of 2:1 to 1:5 In certain such embodiments, the volume ratio of the first product stream of the second product stream is in the range of 1:4 to 1:1.5, or in the range of 1:3 to 1:1; in such embodiments, relatively more of the lower purity second product stream is withdrawn.

Similarly, based on the disclosure herein, the person of ordinary skill in the art can provide different first and second product streams with a variety of propionic acid concentrations. For example, in certain embodiments as otherwise described herein, the first product stream includes no more than 500 ppmw propionic acid (e.g., no more than 350 ppmw, or no more than 250 ppmw, or no more than 150 ppmw). For example, in certain embodiments as otherwise described herein, the first product stream has in the range of 50-350 ppmw, or 75-250 ppmw propionic acid. In other embodiments as otherwise described herein, the first product stream has in the range of 50-500 ppmw propionic acid, or 50-250 ppmw propionic acid, or 50-150 ppmw propionic acid, or 75-500 ppmw propionic acid, or 75-350 ppmw propionic acid, or 75-150 ppmw propionic acid, or 100-500 ppmw propionic acid, or 100-350 ppmw propionic acid, or 100-250 ppmw propionic acid.

In certain embodiments as otherwise described herein, the second product stream (i.e., while also having at least 50 ppmw more propionic acid than the first product stream) has at least 200 ppmw propionic acid (e.g., at least 300 ppmw, or at least 400 ppmw, or at least 500 ppmw). In certain embodiments as otherwise described herein, the second product stream has in the range of 200-1200 ppmw propionic acid, or 200-1000 ppmw propionic acid, or 200-800 ppmw propionic acid, or 200-600 ppmw propionic acid, or 300-1200 ppmw propionic acid, or 300-1000 ppmw propionic acid, or 300-800 ppmw propionic acid, or 400-1200 ppmw propionic acid, or 400-1000 ppmw propionic acid, or 400-800 ppmw propionic acid, or 400-600 ppmw propionic acid, or 500-1200 ppmw propionic acid, or 500-1000 ppmw propionic acid, or 500-800 ppmw propionic acid.

As the person of ordinary skill in the art will appreciate, the product streams are otherwise substantially acetic acid. For example, in certain embodiments, the product streams include at least 99 vol % acetic acid. Of course, one or more of the first and second product streams can include minor impurities such as, for example, water, aldehydes, and formic acid. For example, in certain embodiments as otherwise described herein, one or more of the product streams independently include up to 2,500 ppmw water (e.g., 500-1,500 ppmw water).

One of the parameters the person of ordinary skill in the art can use, based on the disclosure herein, to provide product streams of different propionic acid concentrations is the number of theoretical stages separating the first draw outlet and the second draw outlet. For example, in certain embodiments as otherwise described herein, the first draw outlet and the second draw outlet are separated by at least 1 theoretical stage. In certain embodiments as otherwise described herein, the first draw outlet and the second draw outlet are separated by at least 2, or at least 3, or at least 4 theoretical stages. For example, in certain embodiments as otherwise described herein, the first draw outlet and the second draw outlet are separated by 1-10 theoretical stages, e.g., 2-10, or 3-10, or 1-7, or 2-7, or 3-7, or 1-5, or 2-5, or 3-5 theoretical stages. It will be appreciated by those skilled in the art that the phrase "theoretical stages" will be widely understood within distillation terminology and may refer to equilibrium stages, ideal stages, theoretical trays or theoretical plates. In the case of a trayed column, the number of theoretical stages is related to the number of actual physical trays by the plate or tray efficiency.

In certain embodiments as otherwise described herein, the feed inlet and the first draw outlet are separated by at least 5 theoretical stages. In certain embodiments as otherwise described herein, the feed inlet and the first draw outlet are separated by at least 6, or at least 10, or at least 12 theoretical stages. For example, in certain embodiments as otherwise described herein, the feed inlet and the first draw outlet are separated by 10-20 theoretical stages, e.g., 10-18, or 10-16, or 12-20, or 12-18, or 12-16 theoretical stages.

In certain desirable embodiments as otherwise described herein, the first draw outlet and the second draw outlet are separated by 2-10 (e.g., 2-7, or 2-5) theoretical stages, and the feed inlet and the first draw outlet are separated by 10-18 (e.g., 12-18, or 12-16) theoretical stages.

For example, in certain embodiments as otherwise described herein, the first draw outlet and the second draw outlet are separated by 1-4 (e.g., 1-3) theoretical stages, the first product stream comprises at most 400 ppmw (e.g., at most 300 ppmw, or at most 200 ppmw) propionic acid, and the second product stream comprises 250-1,000 ppmw (e.g., 350-1,000 ppmw, or 450-1,000 ppmw) propionic acid. In certain embodiments as otherwise described herein, the first draw outlet and the second draw outlet are separated by 3-7 (e.g., 4-7) theoretical stages, the first product stream comprises at most 400 ppmw (e.g., at most 300 ppmw, or at most 200 ppmw) propionic acid, and the second product stream comprises 350-1,200 ppmw (e.g., 450-1,200 ppmw, or 550-1,200 ppmw) propionic acid.

Based on the disclosure herein, the person of ordinary skill in the art can select positions of the first and second draw outlets to provide a lower energy consumption while providing acetic acid products having propionic acid concentrations to meet the requirements of downstream customers. Moreover, there are other advantages to using a second draw outlet (e.g., instead of simply bypassing the column with a portion of the feed). Taking product from a second draw outlet at a level above the feed inlet can help to reduce the concentration of corrosion metals in the product, as any entering with the feed will be likely to remain dissolved in the liquid phase and should not migrate upwards with the vapour phase. As described below, alkali metal can be mixed with the feed to a heavy-ends column to prevent iodide contamination of the product. Putting all product through the distillation process and collecting at a level above the feed point can similarly limit any contamination of the product with alkali metals.

Similarly, the person of ordinary skill in the art can, based on the disclosure herein, select a position of the feed inlet in the distillation column to provide a desired energy efficiency in combination with a desired product purity, based, e.g., on the composition profile throughout the column and the composition of the feed stream.

Modelling using process simulation software, for example, can be used to determine appropriate positions of feed inlet, first draw outlet and second draw outlet. Commercially available software such as ASPEN PLUS can be adapted for use by the person or ordinary skill in the art.

In order to provide for operational flexibility, a distillation column for use in the methods and systems described herein can in certain embodiments include a plurality of feed inlets at different vertical positions on the column. The person of ordinary skill in the art can select a desired one of the feed inlets for use in a process as described herein in order to provide a desired product purity.

Similarly, a distillation column for use in the methods and systems described herein can in certain embodiments include three or more draw outlets, each at a different vertical position on the column. The person of ordinary skill in the art can select a desired one of the draw outlets for use as the first draw outlet and another one of the draw outlets for the use as the second draw outlet in a process as described herein in order to provide a desired product purity.

Figure 1:
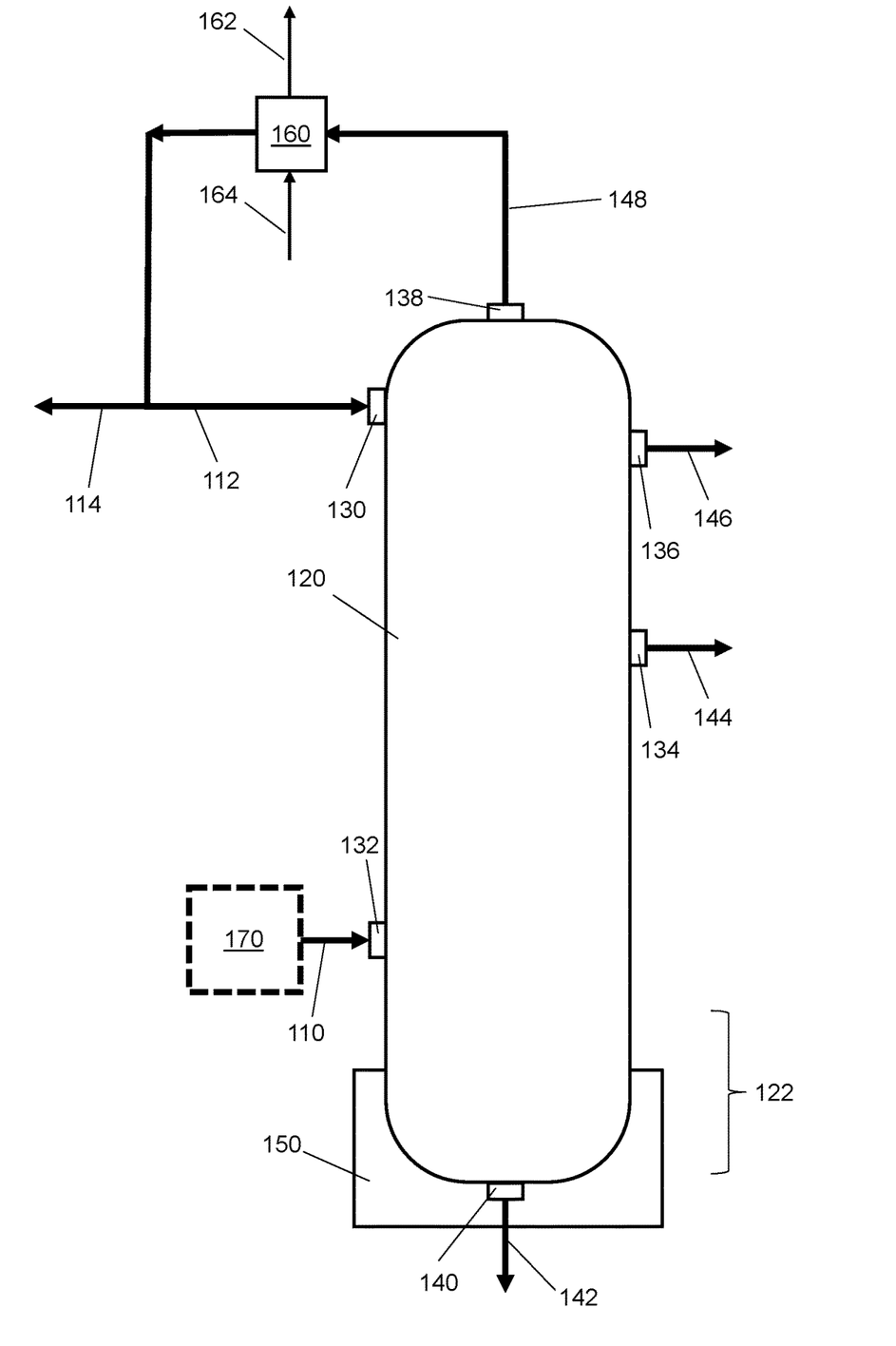
FIG. 1 is a schematic diagram of a distillation system of the disclosure.

The feed stream will typically be a stream of an acetic acid production unit in which acetic acid is produced, e.g., from the carbonylation of methanol as described in more detail below. For example, in certain embodiments the feed stream includes at least a portion of an effluent of a light-ends recovery zone of an acetic acid production unit. In the embodiment of FIG. 1, the feed stream 110 is an effluent of the light-ends recovery zone 170.

The feed stream can be provided at a variety of inlet pressures, depending, e.g., on its source. For example, in certain embodiments as otherwise described herein, the inlet pressure of the feed stream is in the range of 1-10 bara, e.g., 2-8 bara, or 2-6 bara.

The distillation column can be operated at a variety of pressures. For example, in certain embodiments as otherwise described herein, the head pressure of the distillation column is in the range of 0.5-2.5 bara, e.g., 0.75-2.25 bara, or 1-2 bara.

The feed stream can include a variety of amounts of propionic acid. For example, in certain embodiments as otherwise described herein, propionic acid is present in the feed stream in an amount in the range of 250-1,200 ppmw. In certain such embodiments, propionic acid is present in the feed stream in an amount in the range of 300-1,200 ppmw, or 350-1,200 ppmw. The person of ordinary skill in the art will understand that the amount of propionic acid in the feed stream will depend on a number of factors, including the conditions in the reaction zone in which the acetic acid is made and the purity of the feeds to the reaction zone.

Similarly, the feed stream can include a variety of amounts of metals. The feed stream can in certain embodiments include one or metals in a combined amount of at most 5 ppmw, e.g., at most 2.5 ppmw, or at most 1 ppmw. In certain other embodiments, the feed stream can include one or more alkali metals (e.g., sodium and/or potassium, in ionic form) in a combined amount of 1-100 ppmw, e.g., 1-75 ppmw, or 1-50 ppmw, or 1-25 ppmw, or 5-100 ppmw, or 5-75 ppmw, or 5-50 ppmw, or 5-25 ppmw. The present inventors note that presence of alkali metal can help prevent iodide contamination of the product streams. However, the distillation processes described herein can separate the metal(s) from the product streams. Accordingly, in certain embodiments as otherwise described herein, the first product stream and the second product stream each individually comprise less than 1 ppmw, e.g., less than 0.5 ppmw, or less than 0.25 ppmw of a combined amount of the metals.

The product stream(s) from such a distillation process are conventionally traditionally cooled (using a suitable heat exchanger) before entering a storage tank. For example, in certain embodiments as otherwise described herein, one or more of the product streams are cooled to less than 50° C. (e.g., less than 40° C.) before entering a storage tank. However, in other embodiments as otherwise described herein, one or more of the product streams can be supplied hot to a downstream user. This is especially advantageous when the downstream process is integrated locally with the acetic acid production process described herein. This can reduce the energy consumption on the downstream facility due to the reduced need to pre-heat the acid before further processing. Thus, the person of ordinary skill in the art can refrain from substantially cooling one or more of the product streams before providing it to a user. For example, in certain embodiments as otherwise described herein, one or more of the product streams are supplied at a temperature of 90-160° C. (e.g., 100-150° C.) to a downstream user.

In certain embodiments as otherwise described herein, an overhead stream is withdrawn from the distillation column through the vapour outlet and transferred to a heat exchanger. In the heat exchanger, the overhead stream is cooled by the generation of steam (e.g., low-pressure steam), which can be advantageously used in a variety of process operations. A portion of the condensed overhead stream may, for example, be returned to the distillation column as a reflux stream. For example, in the embodiment of FIG. 1, overhead stream 148 is transferred to heat exchanger 160, where it is cooled by heat exchange with a condensate (or boiler feed water) stream 164 to provide low-pressure steam 162. In other embodiments, the overhead stream may be condensed using cooling water. Also shown in the embodiment of FIG. 1, the condensed overhead stream is split to provide a distillate stream 114 and a reflux stream 112, which is recycled to a reflux inlet 130 on the distillation column 120.

In certain embodiments as otherwise described herein, a bottoms stream comprising propionic acid is withdrawn from the distillation column through the bottoms outlet. In the embodiment of FIG. 1, bottoms stream 142 is withdrawn through bottoms outlet 140. In certain embodiments as otherwise described herein, the bottoms stream comprises substantially (e.g., at least 90 wt. %, or at least 95 wt. %, or at least 97.5 wt. %, or at least 99 wt. %) propionic acid and acetic acid. For example, in certain embodiments as otherwise described herein, the bottoms stream comprises 5-50 wt. % acetic acid and 50-95 wt. % propionic acid. In certain embodiments as otherwise described herein, the bottoms stream comprises up to 10 wt. % (e.g., up to 5 wt. %, or up to 2.5 wt. %) of a combined amount of one or more of acetic anhydride, butyric acid, and metal salts and acetates (e.g., alkali metal salts and acetates). In certain embodiments as otherwise described herein, the bottoms stream is withdrawn from the distillation column and transferred to a storage tank (e.g., after cooling the bottoms stream). In certain such embodiments, the withdrawn bottoms stream is purified (e.g., by distillation), and then transferred to a storage tank.

Another aspect of the disclosure is a distillation system for separating a feed stream that includes acetic acid and propionic acid. The distillation system includes a heat source; and a distillation column. The distillation column includes a bottom section in thermal communication with the heat source; a feed inlet positioned at a level above the bottom section, the feed inlet being in fluid communication with a source of the feed stream comprising acetic acid and propionic acid; a first draw outlet (e.g., as a sidedraw outlet) positioned at a level above the feed inlet; a second draw outlet (e.g., as a sidedraw outlet) positioned at a level between the feed inlet and the first draw outlet; a vapour outlet positioned at a level above the first draw outlet; and a bottoms outlet positioned at a level within the bottom section. One embodiment of such a distillation system is described above with respect to FIG. 1. The distillation systems of the disclosure can be arranged as otherwise described herein with respect to the distillation methods.

For example, in certain embodiments as otherwise described herein, the first draw outlet and the second draw outlet of the system are separated by at least 1 theoretical stage. In certain embodiments as otherwise described herein, the first draw outlet and the second draw outlet of the system are separated by at least 2, or at least 3, or at least 4 theoretical stages. For example, in certain embodiments as otherwise described herein, the first draw outlet and the second draw outlet of the system are separated by 1-10 theoretical stages, e.g., 2-10, or 3-10, or 1-7, or 2-7, or 3-7, or 1-5, or 2-5, or 3-5 theoretical stages.

In certain embodiments as otherwise described herein, the feed inlet and the first draw outlet of the system are separated by at least 5 theoretical stages. In certain embodiments as otherwise described herein, the feed inlet and the first draw outlet of the system are separated by at least 6, or at least 10, or at least 12 theoretical stages. For example, in certain embodiments as otherwise described herein, the feed inlet and the first draw outlet of the system are separated by 10-20 theoretical stages, e.g., 10-18, or 10-16, or 12-20, or 12-18, or 12-16 theoretical stages.

In certain desirable embodiments as otherwise described herein, the first draw outlet and the second draw outlet of the system are separated by 2-10 (e.g., 2-7, or 2-5) theoretical stages, and the feed inlet and the first draw outlet of the system are separated by 10-18 (e.g., 12-18, or 12-16) theoretical stages.

In the present invention there is provided a vapour outlet positioned at a level above the first draw outlet. The vapour outlet is generally positioned at the top of the column. The first draw outlet is positioned at a level below the vapour outlet, and is a sidedraw outlet which is preferably located at least 2 theoretical stages from the top of the column, such as 2 to 8 theoretical stages from the top of the column. The location can also be defined relative to the total number of theoretical stages present in the column. Thus, the first draw outlet may be located between 2 and 8 theoretical stages from the top of the column and/or between 2 and a number of theoretical stages that represents 25% of the total number of theoretical stages in the column (from the top of the column). (For example, if there are 25 theoretical stages in total, 25% would represent up to 5 theoretical stages from the top of the column.)

The second draw outlet is positioned at a level between the feed inlet and the first draw outlet i.e. it is below the first draw outlet and above the feed inlet. It is typically located at least 3 theoretical stages from the top of the column, such as 4 to 12 theoretical stages from the top of the column. The location can also be defined relative to the total number of theoretical stages. Thus, the second draw outlet may be located between 4 and 12 theoretical stages from the top of the column and/or between a number of theoretical stages that represents 20% of the total number of theoretical stages in the column and a number of theoretical stages that represents 40% of the total number of theoretical stages in the column (from the top of the column in each case). (For example, if there are 25 theoretical stages in total, 20% to 40% would correspond to between 5 and 10 theoretical stages from the top of the column.)

The feed inlet is preferably located at least 7 theoretical stages from the top of the column, such as 7 to 15 theoretical stages from the top of the column. In terms of position relative to the total number of theoretical stages the feed inlet is generally found in the central portion of the column. It is preferably found between a number of theoretical stages that represents 25% of the total number of theoretical stages in the column and a number of theoretical stages that represents 75% of the total number of theoretical stages in the column (from the top of the column in each case). (These values, of course, being subject to the other requirements in the claim on location relative to the first and second draw outlets.)

In the present invention there is provided a bottoms outlet positioned at a level within the bottom section. The bottoms outlet is generally positioned at the bottom of the bottom section (and also of the column).

The acetic acid production unit described herein is a unit that produces at least acetic acid, and encompasses units that co-produce acetic acid and acetic anhydride. The person of ordinary skill in the art will appreciate that a variety of acetic acid production units can be configured to perform the separation methods described herein. Typically, an acetic acid production unit includes a reaction zone (e.g., including a reactor) and a light-ends recovery zone (e.g., including a light-ends column) configured to recover acetic acid. Other reaction zones and recovery zones can be present. For example, a flash zone is typically employed between the reaction zone and the light-ends recovery zone. Off-gas streams from any part of the acetic acid production unit can be scrubbed as described herein. Production equipment for manufacture of acetic acid, e.g., by the carbonylation of methanol and/or a reactive derivative thereof with carbon monoxide in the presence of a Group VIII metal catalyst, and the operation thereof are familiar to the person of ordinary skill in the art.

In the acetic acid production processes described herein, methanol and/or reactive derivatives thereof can be introduced into the reaction zone as liquid reactants (i.e., to form a liquid reaction composition in the reaction zone). For example, in certain desirable embodiments of the processes as otherwise described herein, methanol is introduced into the reaction zone as a reactant. In other processes as otherwise described herein, one or more reactive derivatives are introduced into the reaction zone as a reactant, or a combination of methanol together with one or more reactive derivatives of methanol are introduced into the reaction zone as reactants. As used herein, "reactive derivatives" of methanol are methyl acetate, dimethyl ether, and methyl iodide. In certain embodiments as otherwise described herein, methanol and/or methyl acetate are used as liquid reactants. In one embodiment as otherwise described herein, methanol is used as a reactant; in another embodiment as otherwise described herein, methyl acetate is used as a reactant; and in yet another embodiment as otherwise described herein, a mixture of methanol and methyl acetate is used as a reactant.

The processes described herein can employ a variety of carbonylation catalysts, e.g., a group VIII noble metal carbonylation catalyst. The catalyst can include a group VIII species supported on an inert support, e.g., a carbon support. In certain desirable embodiments as otherwise described herein, the carbonylation catalyst comprises rhodium, iridium, or mixtures thereof. In one particular embodiment of the present invention, the carbonylation catalyst is iridium. In another particular embodiment as otherwise described herein, the carbonylation catalyst is a rhodium catalyst. A catalyst promoter may optionally be present, for example, selected from alkali metal iodides (e.g., lithium iodide), alkaline earth metal iodides, aluminum group metal iodides, organic iodide salts, ruthenium, osmium, rhenium, and mixtures thereof. Where the catalyst is a rhodium catalyst, the optional carbonylation catalyst promoter may desirably be selected from the alkali metal iodides, for example, lithium iodide, alkaline earth metal iodides, aluminum-group metal iodides and/or organic iodide salts, and mixtures thereof. Where the catalyst is an iridium catalyst, the optional carbonylation catalyst promoter may desirably be selected from the group consisting of ruthenium, osmium, rhenium, and mixtures thereof.

Where the carbonylation catalyst is an iridium catalyst, the iridium catalyst can include any iridium-containing compound that is substantially soluble in the liquid reaction composition. The iridium catalyst can be added to the liquid reaction composition in any suitable form that substantially dissolves in the liquid reaction composition or is convertible to a soluble form. The iridium catalyst is desirably used as a chloride free compound, e.g., an acetate, soluble in one or more of the liquid reaction composition components (e.g., water and/or acetic acid) and so may be added to the reaction as solutions therein. Examples of suitable iridium-containing compounds which can be added to the liquid reaction composition include $IrCl_3$, $IrI_3$, $IrBr_3$, $[Ir(CO)_2I]_2$, $[Ir(CO)_2Cl]_2$, $[Ir(CO)_2Br]2$, $[Ir(CO)_4I_2]^-H^+$, $[Ir(CO)_2Br_2]^-H^+$, $[Ir(CO)_2I_2]^-H^+$, $[Ir(CH_3)I_3(CO)_2]^-H^+$, $Ir_4(CO)_{12}$, $IrCl_3 \cdot 4H_2O$, $IrBr_3 \cdot 4H_2O$, $Ir_3(CO)_{12}$, iridium metal, $Ir_2O_3$, $IrO_2$, $Ir(acac)(CO)_2$, $Ir(acac)_3$, iridium acetate, $[Ir_3O(OAc)_6(H_2O)_3][OAc]$, and hexachloroiridic acid $H_2[IrCl_6]$, desirably chloride-free complexes of iridium such as acetates, oxalates and acetoacetates.

When present, the concentration of the iridium catalyst in a liquid reaction composition in the reaction zone can be, e.g., independently in the range 100 to 6000 ppmw of iridium.

When the carbonylation catalyst is an iridium catalyst, the carbonylation catalyst promoter is desirably ruthenium. The promoter can include any ruthenium-containing compound that is substantially soluble in the liquid reaction composition. The ruthenium promoter can be added to the liquid reaction composition in any suitable form that substantially dissolves in the liquid reaction composition or is convertible to soluble form. The ruthenium promoter compound is desirably used as a chloride free compound, e.g., an acetate, soluble in one or more of the liquid reaction composition components (e.g., water and/or acetic acid) and so may be added to the reaction as solutions therein.

Examples of suitable ruthenium-containing compounds which may be used include ruthenium (III) chloride, ruthenium (III) chloride trihydrate, ruthenium (IV) chloride, ruthenium (III) bromide, ruthenium (III) iodide, ruthenium metal, ruthenium oxides, ruthenium (III) formate, $[Ru(CO)_3I_3]^-H^+$, tetra(aceto)chlororuthenium (II, III), ruthenium (III) acetate, ruthenium (III) propionate, ruthenium(III) butyrate, ruthenium pentacarbonyl, triruthenium­dodecacarbonyl and mixed ruthenium halocarbonyls such as dichlorotricarbonyl­ruthenium (II) dimer, dibromotricarbonylruthenium (II) dimer, and other organoruthenium complexes such as tetra­chlorobis(4-cymene)diruthenium (II), tetrachlorobis(ben­zene)diruthenium(II), dichloro(cycloocta-1,5-diene)ruthe­nium (II) polymer and tris(acetylacetonate)ruthenium (III). Desirably, the ruthenium-containing compounds are free of impurities which provide or generate in-situ ionic iodides which may inhibit the reaction, for example, alkali or alkaline earth metal or other metal salts.

The ruthenium promoter can be present in any effective amount up to the limit of its solubility in the liquid reaction composition, the liquid fraction and/or any liquid process streams recycled to the carbonylation reaction zones. For example, the ruthenium promoter is suitably present in the liquid reaction composition at a molar ratio of each ruthenium promoter:iridium in the range [0.1 to 100]:1, preferably [greater than 0.5]:1, more preferably [greater than 1]:1 and preferably [up to 20]:1 more preferably [up to 15]:1 and yet more preferably [up to 10]:1. The concentration of ruthenium promoter in the liquid reaction composition in the reaction zone is typically less than 6000 ppmw. Suitable promoter concentrations range from, for example, 400 to 5000 ppmw, such as 2000 to 4000 ppmw.

Suitable rhodium carbonylation catalysts are described, for example, in EP-A-0 161 874, U.S. Pat. No. 6,211,405 and EP-A-0728727, each of which is hereby incorporated herein by reference in its entirety. Where the carbonylation catalyst is a rhodium catalyst, the rhodium catalyst concentration in the liquid reaction composition is preferably in the range 50 to 5000 ppmw, preferably 100 to 1500 ppmw of rhodium. Where rhodium is used as the catalyst, an alkali metal iodide, such as lithium iodide is preferably used as the promoter, as described, for example, in the references cited above.

Thus, in certain embodiments, homogeneous carbonylation of methanol and/or a reactive derivative thereof by carbon monoxide is catalyzed by a soluble Group VIII metal carbonylation catalyst (e.g., comprising rhodium and/or iridium) in a liquid reaction composition including the methanol and/or the reactive derivative thereof. In certain embodiments, the liquid reaction composition includes water and one or more of methyl iodide and methyl acetate. In certain such embodiments, the liquid reaction composition further comprises propionic acid by-product.

As described above, water can be present in the liquid reaction composition. The person of ordinary skill in the art will appreciate that water is formed in situ in the liquid reaction composition by an esterification reaction between methanol and/or reactive derivative thereof and acetic acid product. In certain embodiments, water can also be introduced to the reaction zone (e.g., together with, or separately from other components of the liquid reaction composition). In certain desirable embodiments, water is present in the liquid reaction composition in an amount in the range of 0.1 wt. % to 15 wt. %, e.g., in the range of 1 wt. % to 15 wt. %, or in the range of 1 wt. % to 8 wt. %.

Methyl acetate may be formed in situ in the liquid reaction composition by the reaction of methanol and/or reactive derivative thereof with the acetic acid product or solvent. In certain embodiments as otherwise described herein, the concentration of methyl acetate in the liquid reaction composition in the reaction zone is in the range 2 to 50 wt %, for example, 3 to 35 wt %.

As described above, propionic acid by-product can also be present in the liquid reaction composition. In certain embodiments, propionic acid is present in the liquid reaction composition in an amount in the range of 200 ppmw to 2,500 ppmw, e.g., in the range of 400 ppmw to 2,000 ppmw, or in the range of 600 ppmw to 1,400 ppmw.

In certain desirable embodiments, methyl iodide is present in the liquid reaction composition in an amount in the range of 1 wt. % to 20 wt. %. For example, in certain such embodiments, methyl iodide is present in the liquid reaction composition in an amount in the range of 2 wt. % to 16 wt. %.

In certain embodiments as otherwise described herein, the liquid reaction composition comprises a solvent. For example, in certain such embodiments, the liquid reaction composition comprises an acetic acid solvent (e.g., recycled from a separation zone of the acetic acid production unit).

As described above, acetic acid can be produced in the reaction zone by carbonylation of methanol and/or a reactive derivative thereof with carbon monoxide. In certain embodiments as otherwise described herein, the carbon monoxide provided to the reaction zone is essentially pure. In other embodiments, the carbon monoxide provided to the reaction zone contains one or more impurities such as, for example, carbon dioxide, methane, nitrogen, hydrogen, or noble gases. In certain embodiments as otherwise described herein, the partial pressure of carbon monoxide (e.g., in a reactor of the reaction zone) is in the range of 1 bar to 70 bar, e.g., in the range of 1 bar to 35 bar.

In certain embodiments as otherwise described herein, the carbonylation reaction in the reaction zone is conducted at a total pressure (e.g., in a reactor of the reaction zone) in the range of 10 barg to 100 barg.

The effluent of the reaction zone can be conducted to a flash separation zone (e.g., by a flashing valve), where it is separated into a vapour stream and a liquid stream containing the carbonylation catalyst. The liquid stream can be introduced (i.e. as recycle) to the reaction zone. For example, in certain embodiments as otherwise described herein, the effluent of the reaction zone is conducted to a flash separation zone to form a vapour fraction and a liquid fraction, and at least a portion of the liquid fraction is recycled to the reaction zone.

Flash separation zones are known in the art. The flash separation zone can in certain embodiments include an adiabatic flash vessel. Alternatively or additionally, the flash separation zone can be heated, e.g., by a heater. The flash separation zone can typically be operated at a pressure in the range of 0 to 10 barg, preferably 0 to 3 barg.

The carbonylation process as described herein can be conducted as a batch process or as a continuous process. In certain desirable embodiments, the carbonylation process is conducted as a continuous process.

In certain embodiments, at least a portion of the vapour fraction of the flash separation zone is conducted to a light-ends recovery zone of the acetic acid production unit. In certain embodiments, the light-ends recovery zone of the acetic acid production unit is configured to separate at least the components that are more volatile than acetic acid, from acetic acid. For example, in certain embodiments, acetic acid is produced in the reaction zone by carbonylation of methanol and/or a reactive derivative thereof with carbon monoxide in the presence of a Group VIII metal catalyst system, and the light-ends recovery zone of the acetic acid production unit is configured to separate acetic acid and to further separate methyl iodide and methyl acetate, which can be recycled to the reaction zone.

In certain embodiments as otherwise described herein, the light-ends recovery zone comprises a distillation column that separates crude acetic acid product comprising acetic acid and propionic acid from a light-ends fraction including methyl iodide and methyl acetate. In certain such embodiments, the light-ends recovery zone further comprises a drying column. For example, in certain embodiments as otherwise described herein, the light-ends recovery zone comprises a combined light-ends and drying column, in which water is removed from crude acetic acid product to form a dry acetic acid product comprising acetic acid and propionic acid. As used herein, a "dry" or "dried" stream comprising acetic acid (e.g., and optionally propionic acid) comprises water in an amount of at most 1,500 ppmw.

Suitable columns which may be employed in the light-ends recovery zone, and configurations thereof, are generally known in the art. Typically, at least a first fraction comprising acetic acid and propionic acid, and an overhead vapour fraction comprising methyl acetate, water, acetic acid, carbon monoxide, and methyl iodide are formed in the light-ends recovery zone. In certain embodiments, the separated water can be recycled to the reaction zone, or removed from the acetic acid production unit.

In certain embodiments as otherwise described herein, the light-ends recovery zone further comprises one or more condensers and/or coolers to condense the overhead vapour fraction and form a liquid fraction. The person of ordinary skill in the art will appreciate that any suitable method known in the art to condense the overhead vapour fraction to the liquid phase can be employed. For example, in certain embodiments, the fraction is condensed using at least one heat exchanger (e.g., supplied with water as cooling medium). Components of the overhead fraction that are not condensed (e.g., carbon monoxide, carbon dioxide, inert gases, reaction by-product gases) are removed from the light-ends recovery zone as an off-gas stream. In certain embodiments, acetic acid is produced in the reaction zone by carbonylation of methanol and/or a reactive derivative thereof with carbon monoxide in the presence of a Group VIII metal catalyst system, and the off-gas stream removed from the light-ends recovery zone further comprises methyl iodide (e.g., present as entrained and/or evaporated methyl iodide), methyl acetate, and water.

In certain embodiments, the liquid fraction formed in the light-ends recovery zone comprises methyl acetate, water, and acetic acid. In certain embodiments, acetic acid is produced in the reaction zone by carbonylation of methanol and/or a reactive derivative thereof with carbon monoxide in the presence of a Group VIII metal catalyst system, and the liquid fraction further comprises methyl iodide. In certain embodiments, the liquid fraction further comprises entrained or dissolved gaseous components (e.g., carbon monoxide, carbon dioxide, inert gases).

In certain embodiments as otherwise described herein, the light-ends recovery zone comprises a decanter, in which the liquid fraction is separated into two layers: a lower (e.g., organic) layer comprising methyl acetate and an upper (e.g., aqueous) layer comprising water. In certain embodiments, acetic acid is produced in the reaction zone by carbonylation of methanol and/or a reactive derivative thereof with carbon monoxide in the presence of a Group VIII metal catalyst system, and the lower layer further comprises methyl iodide. In certain embodiments, at least a portion (e.g., all) of the upper layer from the decanter is returned to a distillation column of the light-ends recovery zone, as a reflux stream. In certain embodiments, at least a portion (e.g., all) of the upper layer from the decanter is recycled to the reaction zone. In certain embodiments, off-gas is withdrawn from the decanter and transferred to an off-gas scrubbing unit (e.g., before disposal).

Typically, it is a stream comprising acetic acid and propionic acid from the light-ends recovery section (e.g., the first fraction formed in the light-ends recovery section) that is used as the feed stream for the distillation processes as described herein. That is, the distillation processes described herein can be operated as a so-called "heavy-ends" process to provide purified acetic acid products.

Certain aspects of the disclosure are further described by the following non-limiting example study.

A set of distillation processes was modelled using ASPEN software. A series of seven cases is provided in the table below. In all cases, the distillation column has 25 theoretical stages, the feed stream is fed to a feed inlet above the $9^{th}$ stage, and the first draw stream is withdrawn from a first draw outlet on the $2^{nd}$ stage (both as measured from the top of the column). In cases 2 and 3 a second draw stream is withdrawn from a second draw outlet on the $4^{th}$ stage, whilst in cases 4 and 5 a second draw stream is withdrawn from a second draw outlet on the $7^{th}$ stage. In all cases, the feed propionic acid concentration was 500 ppm by weight (ppmw), the feed inlet pressure was 4 bara, and the column head pressure was 1.5 bara. In all cases, "Product 1" is an acetic acid product having 150 ppmw acetic acid as a more pure product stream. While this value will meet most customers' requirements, the person or ordinary skill in the art will appreciate that a cleaner product stream can be provided with a higher or lower concentration of propionic acid.

| Case | Prod. 1 fraction | Prod. 1 [PrCOOH] (ppmw) | Prod. 2 fraction | Prod. 2 [PrCOOH] (ppmw) | Reboiler duty (MW) |
|---|---|---|---|---|---|
| 1 | 1.00 | 150 | — | — | 13.733 |
| 2 | 0.75 | 150 | 0.25 | 300 | 11.875 |
| 3 | 0.50 | 150 | 0.50 | 310 | 10.011 |
| 4 | 0.75 | 150 | 0.25 | 470 | 10.310 |
| 5 | 0.50 | 150 | 0.50 | 480 | 6.854 |
| 6 | 0.75 | 150 | — | — | 10.348 |
| 7 | 0.50 | 150 | — | — | 7.032 |

Case 1 represents a conventional mode of operation of a heavy-ends column in an acetic acid production unit. Here, all of the product is provided from a first sidedraw outlet as a relatively pure product stream having a propionic acid concentration of 150 ppmw. This incurs significant energy cost in the form of a reboiler duty of 13.733 MW.

Case 2 represents an example of a heavy ends distillation process according to the disclosure, with a secondary sidedraw outlet positioned below the first sidedraw outlet but above the feed inlet location. In this case, 75% of the product is withdrawn as Product 1 through the first sidedraw at a propionic acid concentration of 150 ppmw, while 25% of the product is withdrawn through the second sidedraw outlet as Product 2 at a propionic acid concentration of 300 ppmw. Notably, the total energy demand on the column reboiler is reduced by 13.5% compared with Case 1.

Case 3 is essentially an extension of case 2. Here, 50% of the product is withdrawn as Product 1 through the first sidedraw, and 50% is withdrawn as Product 2 through the second sidedraw outlet at a propionic acid concentration of 310 ppmw. Here, the total energy consumption is reduced by 27%.

When there are customers that can accept product with even higher propionic acid concentrations, then the second sidedraw can be positioned relatively closer to the feed inlet. This is represented by cases 4 and 5, which result in a second product with propionic acid concentrations nearer to 500 ppmw. As compared to cases 2 and 3, additional energy is saved.

If a customer were able to accept product with a propionic acid concentration equal to that in the feed stream to the column, one alternative approach would be to simply separate a portion of the feed to the column and bypass the heavy-ends column completely for that fraction of the material. This is represented by cases 6 and 7, which should be compared with cases 4 and 5 respectively. Surprisingly, the modelling indicates that bypassing the column with a fraction of the feed results in a greater net energy consumption than feeding the entire stream to the column and withdrawing a second product close to the feed point. Without intending to be bound by theory, the inventor notes that the immediately-upstream column (either a drying column or light-ends column, depending on configuration) typically operates at a greater pressure than the heavy-ends column used to provide the acetic acid product. The stream leaving this upstream column is typically at or close to saturation temperature and consequently will flash on entering the downstream heavy-ends column. The consequential generation of vapour generates some of the vapour load required within the column to achieve the desired separation and consequently reduces the demand on the column reboiler. Without intending to be bound by theory, it is believed that this explains the surprising result that feeding the entire stream to the column (cases 4 and 5) results in a lower energy consumption than bypassing a portion of the column feed (cases 6 and 7).

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A process for separating a feed stream comprising acetic acid and propionic acid in a distillation column, the distillation column comprising
a bottom section in thermal communication with a heat source;
a feed inlet positioned at a level above the bottom section;
a first draw outlet positioned at a level above the feed inlet;
a second draw outlet positioned at a level between the feed inlet and the first draw outlet;
a vapour outlet positioned at a level above the first draw outlet; and
a bottoms outlet positioned at a level within the bottom section;
the process comprising
providing heat from the heat source at the bottom section of the distillation column;
introducing the feed stream into the distillation column through the feed inlet;
withdrawing a first product stream comprising acetic acid and propionic acid from the first draw outlet; and
withdrawing a second product stream comprising acetic acid and propionic acid from the second draw outlet;
wherein
a volume ratio of the first product stream to the second product stream is in the range of 1:9 to 19:1; and
an amount of propionic acid present in the second product stream is at least 50 ppmw greater than the amount of propionic acid present in the first product stream.

2. The process of claim 1, wherein the volume ratio of the first product stream to the second product stream is in the range of 1:2 to 5:1.

3. The process of claim 1, wherein the volume ratio of the first product stream to the second product stream is in the range of 2:1 to 1:5.

4. The process of claim 1, wherein the first product stream comprises no more than 500 ppmw propionic acid.

5. The process of claim 1, wherein the second product stream comprises at least 200 ppmw propionic acid.

6. The process of claim 1, wherein the first draw outlet and the second draw outlet are separated by at least 1 theoretical stages.

7. The process of claim 6, wherein
the first product stream comprises at most 400 ppmw propionic acid; and
the second product stream comprises 250-1000 ppmw propionic acid.

8. The process of claim 1, wherein the first draw outlet and the second draw outlet are separated by 3-7 theoretical stages.

9. The process of claim 8, wherein
the first product stream comprises at most 400 ppmw propionic acid; and
the second product stream comprises 250-1200 ppmw propionic acid.

10. The process of claim 1, wherein the feed inlet and the first draw outlet are separated by at least 5 theoretical stages.

11. The process of claim 1, wherein propionic acid is present in the feed stream in an amount in the range of 250-1200 ppmw.

12. The process of claim 1, wherein the feed stream includes at least a portion of an effluent of a light-ends recovery zone of an acetic acid production unit.

13. The process of claim 1, wherein the feed stream includes one or more alkali metals, present in the feed stream in a combined amount of 1-100 ppmw.

14. The process of claim 13, wherein the first product stream and the second product stream each individually comprise less than 1 ppmw of a combined amount of the metals.

15. The process of claim 1, further comprising
transferring an overhead stream withdrawn from the distillation column through the vapour outlet to a heat exchanger; and
in the heat exchanger, cooling the overhead stream by generating steam.

16. The process of claim 1, wherein an inlet pressure of the feed stream is 1-10 bara.

17. The process of claim 1, wherein a head pressure of the distillation column is 0.5-2.5 bara.

* * * * *